(No Model.)
H. G. SWEENEY.
TIRE FASTENING.
No. 594,500.  Patented Nov. 30, 1897.
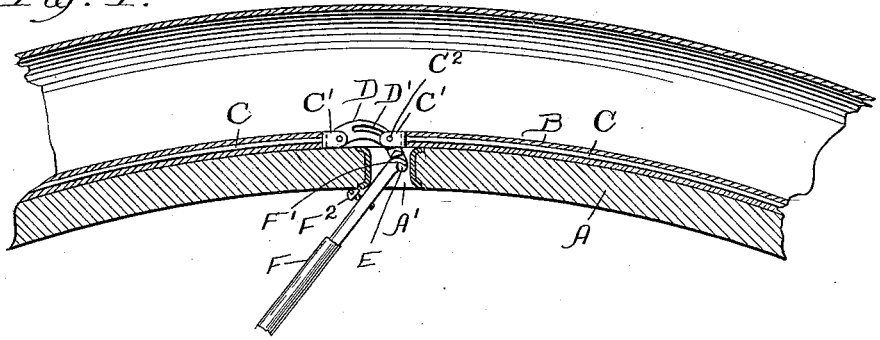
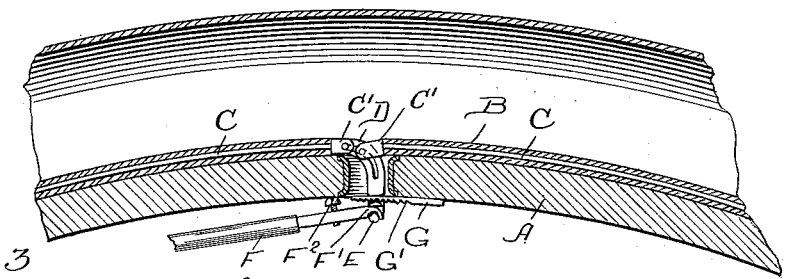
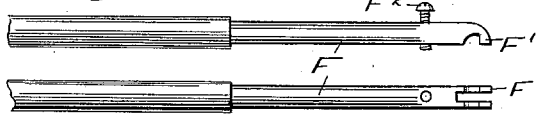
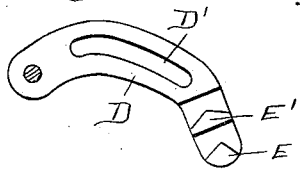 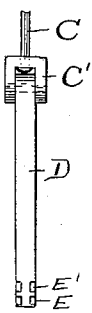 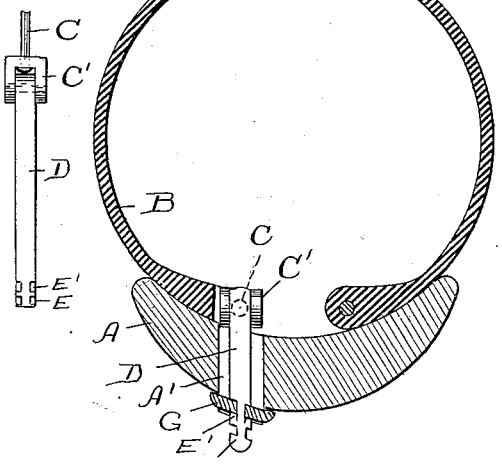
Witnesses:
Frank S. Blanchard
Sew. E. Curtis
Inventor:
Henry G. Sweeney
By Munday, Evarts & Adcock
Attorneys

UNITED STATES PATENT OFFICE.

HENRY G. SWEENEY, OF CHICAGO, ILLINOIS.

TIRE-FASTENING.

SPECIFICATION forming part of Letters Patent No. 594,500, dated November 30, 1897.

Application filed June 4, 1897. Serial No. 639,376. (No model.)

*To all whom it may concern:*

Be it known that I, HENRY G. SWEENEY, a citizen of the United States, residing in Chicago, in the county of Cook and State of Illinois, have invented a new and useful Improvement in Tire-Fastenings, of which the following is a specification.

This invention relates to an improvement in the construction of fastening devices whereby the sheaths of pneumatic tires are secured to the rims of bicycle and other wheels.

It consists of the novel devices and novel combinations of parts and devices herein shown and described, and specified in the claims.

In the accompanying drawings, forming a part of this specification and in which similar letters of reference indicate like parts throughout the several views, Figures 1 and 2 are partial longitudinal sections of a sheath and rim with which my fastening is employed, showing the fastening in different positions. Fig. 3 is a plan and side view of the lever used in closing the fastening. Fig. 4 is a cross-section of the parts shown at Figs. 1 and 2. Figs. 5 and 6 are side and edge views of the slotted tightener, and Fig. 7 is a plan of the keeper acting to hold the tightener in its acting position.

In said drawings, A represents the rim of the wheel, having an opening at A', preferably eyeleted or otherwise lined.

B is the sheath of the pneumatic tire and which acts as a protector for the air-tube customarily employed with such sheaths. I have not shown the air-tube, as its construction and mode of use are both well known. Along each edge of the sheath an attaching-wire C is arranged, and such wires are secured to the sheath either by passing them through longitudinal openings in it, which is the method shown, or they are secured in some other suitable manner which will enable them to insure the retention of the edges of the sheath within the hollow of the rim A.

At least one of the wires C is provided with a releasable fastening adapted to be released whenever the sheath needs to be opened up for any cause, such as the repair of a puncture, and this releasable fastening consists, essentially, of a tightener adapted to be operated through the opening A', and acting when drawn into said opening to create the necessary tension upon the wire and when released to relieve the tension. This tightener, which is shown at D, I prefer to make in curved form and also to slot, as shown at D'. One of the heads C' upon the wire is joined to one end of the tightener, preferably by a pivot-joint, and the other head C' has a sliding attachment to the tightener, preferably obtained by means of the pin $C^2$, which passes through and works in the slot of the tightener, the latter being located at and adapted to be drawn through the opening A' in the rim A. The tightener is preferably provided with a shoulder or shoulders E at its outer end adapted to be engaged by the lever F or other suitable tool used in operating the tightener. I prefer to form the lever with a hook F' at its end and also with a fulcrum $F^2$, which is desirably adjustable and which will set against the rim, as seen at Figs. 1 and 2.

The parts are shown at Fig. 1 with the wire C loosened and the lever in position ready to actuate the tightener in tightening the wire. At the close of the operation the parts will be in the positions shown at Fig. 2, and tension is thereby obtained upon the wire by drawing the tightener into the opening A', this operation causing the ends of the wire to move together to the extent necessary. To sustain the tension, a keeper G, preferably forked so it may pass to either side of the tightener and having a roughened surface G', is positioned, as shown, between the inner surface of the wood rim and the shoulders E' upon the sides of the tightener. I prefer that the shoulders E' be sharp or pointed at the center, as shown, so they may engage the roughened surface of the keeper G and prevent the latter from falling out or becoming lost.

My improved fastener is very quickly and easily operated, and is so little noticed that it does not disfigure the wheel.

The tightener constitutes in reality an extension of the wire, and consequently when the user draws it into the opening A' he is in effect drawing upon the wire.

I claim—

1. The combination with the tire-sheath and attaching-wire C, of a curved and slotted tightener adapted to be drawn through the rim and having a flexible attachment to one end and an attachment sliding in its slot to the other end of the wire, substantially as specified.

2. The combination with the rim having an opening through it, the tire-sheath and the attaching-wire, of a tightener movable longitudinally through said opening in the rim and having a flexible attachment to one end of the wire and a sliding attachment to the other end thereof, and a removable keeper engaging the projecting end of the tightener and retaining the tension upon the wire, substantially as specified.

3. The combination with the rim having an opening through it, the sheath and the attaching-wire, of a curved tightener or take-up attached to the wire and adapted to engage and be drawn through the rim by a detached hand-lever, and a keeper engaging the end so drawn through, substantially as specified.

4. The combination with the rim having an opening through it, the sheath and the attaching-wire, of a curved tightener or take-up flexibly joined to one end of the wire and slidingly attached to the other end thereof, said tightener being also adapted to be engaged by a hand-lever and drawn longitudinally through said opening, and means engaging the end so drawn through and serving to retain the tension, substantially as specified.

HENRY G. SWEENEY.

Witnesses:
H. M. MUNDAY,
L. E. CURTIS.